United States Patent
Brownell et al.

(10) Patent No.: US 8,174,977 B2
(45) Date of Patent: May 8, 2012

(54) END-TO-END FLOW CONTROL IN A NETWORK

(75) Inventors: Paul V. Brownell, Houston, TX (US); David L. Matthews, Cypress, TX (US); James Xuan Dinh, Austin, TX (US); Hubert E. Brinkmann, Spring, TX (US); Dwight D. Riley, Houston, TX (US); Hahn Vo Norden, Houston, TX (US); Kenneth T. Chin, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 809 days.

(21) Appl. No.: 11/825,492

(22) Filed: Jul. 6, 2007

(65) Prior Publication Data
US 2009/0010159 A1 Jan. 8, 2009

(51) Int. Cl.
*H04L 12/26* (2006.01)
(52) U.S. Cl. ........................................ 370/231; 370/230
(58) Field of Classification Search .................. 370/452, 370/229, 364, 235, 236, 60.1, 503; 716/5; 709/218
See application file for complete search history.

(56) References Cited

U.S. PATENT DOCUMENTS

| | | | |
|---|---|---|---|
| 5,528,591 A * | 6/1996 | Lauer ............................ | 370/231 |
| 5,673,253 A | 9/1997 | Shaffer | |
| 6,078,565 A * | 6/2000 | Ben-Michael et al. ....... | 370/236 |
| 6,570,850 B1 | 5/2003 | Gutierrez et al. | |
| 6,683,850 B1 | 1/2004 | Dunning et al. | |
| 6,801,500 B1 | 10/2004 | Chandran | |
| 7,035,220 B1 * | 4/2006 | Simcoe ......................... | 370/236 |
| 7,096,306 B2 | 8/2006 | Riley | |
| 7,225,274 B2 | 5/2007 | Heppenstall et al. | |
| 7,327,680 B1 * | 2/2008 | Kloth ............................ | 370/235 |
| 2004/0004961 A1 * | 1/2004 | Lakshmanamurthy et al. ............................. | 370/364 |
| 2004/0221251 A1 * | 11/2004 | Bozkaya et al. .................. | 716/5 |
| 2006/0067356 A1 * | 3/2006 | Kim et al. ...................... | 370/452 |
| 2006/0206655 A1 | 9/2006 | Chappell et al. | |
| 2006/0259656 A1 | 11/2006 | Sullivan | |
| 2007/0121495 A1 * | 5/2007 | Breti et al. .................... | 370/229 |
| 2008/0144670 A1 * | 6/2008 | Goossens et al. ............. | 370/503 |
| 2009/0100148 A1 * | 4/2009 | Murali et al. .................. | 709/218 |

FOREIGN PATENT DOCUMENTS
CN 1220075 6/1999

OTHER PUBLICATIONS
DE Office Action, dated Jun. 25, 2010, not translated, 5 pages.

\* cited by examiner

*Primary Examiner* — Kwang B Yao
*Assistant Examiner* — Syed M Bokhari

(57) ABSTRACT

A network node within a network includes a first receive buffer, first buffer management, a second receive buffer and second buffer management. The first buffer management performs link level credit based flow control for network packets that the first buffer management places in the first receive buffer. The second buffer management performs end-to-end credit based flow control for network packets that the second buffer management receives from the first receive buffer and processes before placing data in the second receive buffer.

16 Claims, 3 Drawing Sheets

END-TO-END FLOW CONTROL IN A NETWORK

BACKGROUND

The Peripheral Component Interconnect Express (PCIe) computer bus standard is used for computer expansion cards and graphic cards. PCIe is both full duplex and point-to-point. PCIe is a layered protocol and has a physical layer, a data link layer and a transaction layer.

In the physical layer, a connection between any two PCIe devices is known as a link. Each link is built up from one or more lanes. More lanes allow for higher rate of data flow through a link.

The data link layers provide sequencing for Transaction Layer Packets (TLPs). The TLPs are generated by the transaction layer. The data link layer uses acknowledgments (ACKs) and negative acknowledgements (NAKs) to guarantee delivery of TLPs. ACKs and NAKs are communicated by data link layer packets (DLLPs) that are low level packets. DLLPS also are also used for power management functions.

PCIe utilizes link level credit-based flow control. In link-level credit-base flow control, credits are based on the amount of space available in receive buffers that receive data into the transaction layer from the data link layer. Each device on a link advertises an initial credit limit to the device on the other end of the link. A device will only send a TLP across the link when sending the TLP will not exceed the current credit limit for the receiving device. Upon sending a TLP, the sending TLP will subtract the number of credits used by the TLP from the current credit limit. When the receiving device finishes processing the TLP from its receive buffer, the receiving device will signal a return of credits to the sending device. The sending device then adds the number of credits returned to the current credit limit. Counters used to count credits are modular and modular arithmetic is used to determine a current credit limit. DLLPs are used to communicate flow control information between two connected devices.

When using link level credit-based flow control, the latency of credit return does not affect performance as long as the credit limit is not encountered.

DESCRIPTION OF THE EMBODIMENT

Figure 1:
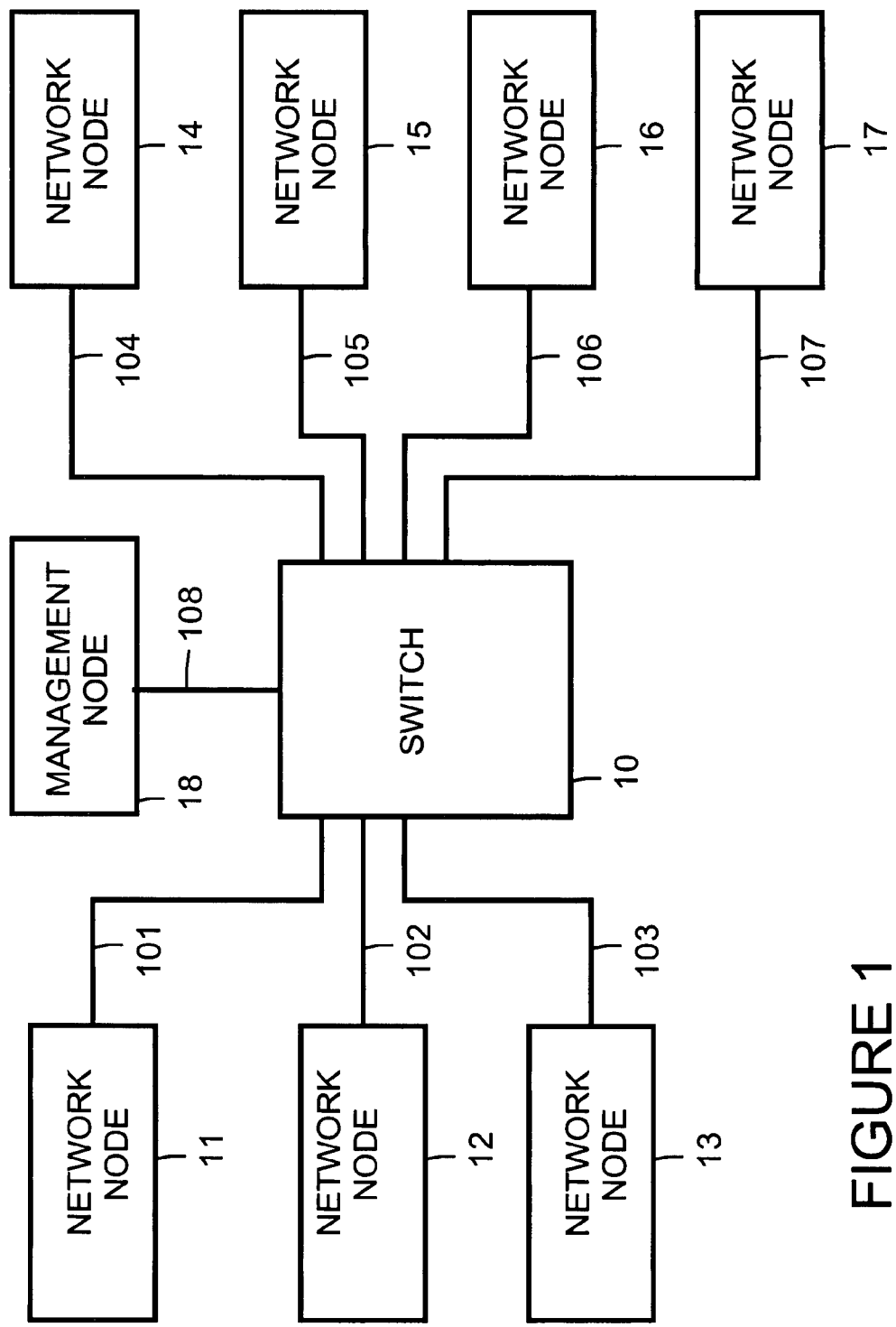
FIG. 1 shows a PCI network domain in accordance with an embodiment of the present invention.

FIG. 1 shows a PCIe network domain that includes a network node 11, a network node 12, a network node 13, a network node 14, a network node 15, a network node 16, a network node 17 and a management mode 18 interconnected by a switch 10. One or more of the network nodes are host nodes and one or more of the network nodes are input/output (I/O) nodes. While seven network nodes are shown connected to switch 10, this is only illustrative as the size of switch 10 and the number of network nodes can vary widely in PCIe network domains, as is known by persons of ordinary skill in the art.

A line 101 represents a data link between network node 11 and switch 10. A line 102 represents a data link between network node 12 and switch 10. A line 103 represents a data link between network node 13 and switch 10. A line 104 represents a data link between network node 14 and switch 10. A line 105 represents a data link between network node 15 and switch 10. A line 106 represents a data link between network node 16 and switch 10. A line 107 represents a data link between network node 17 and switch 10. A line 108 represents a data link between management node 18 and switch 10.

Figure 2:
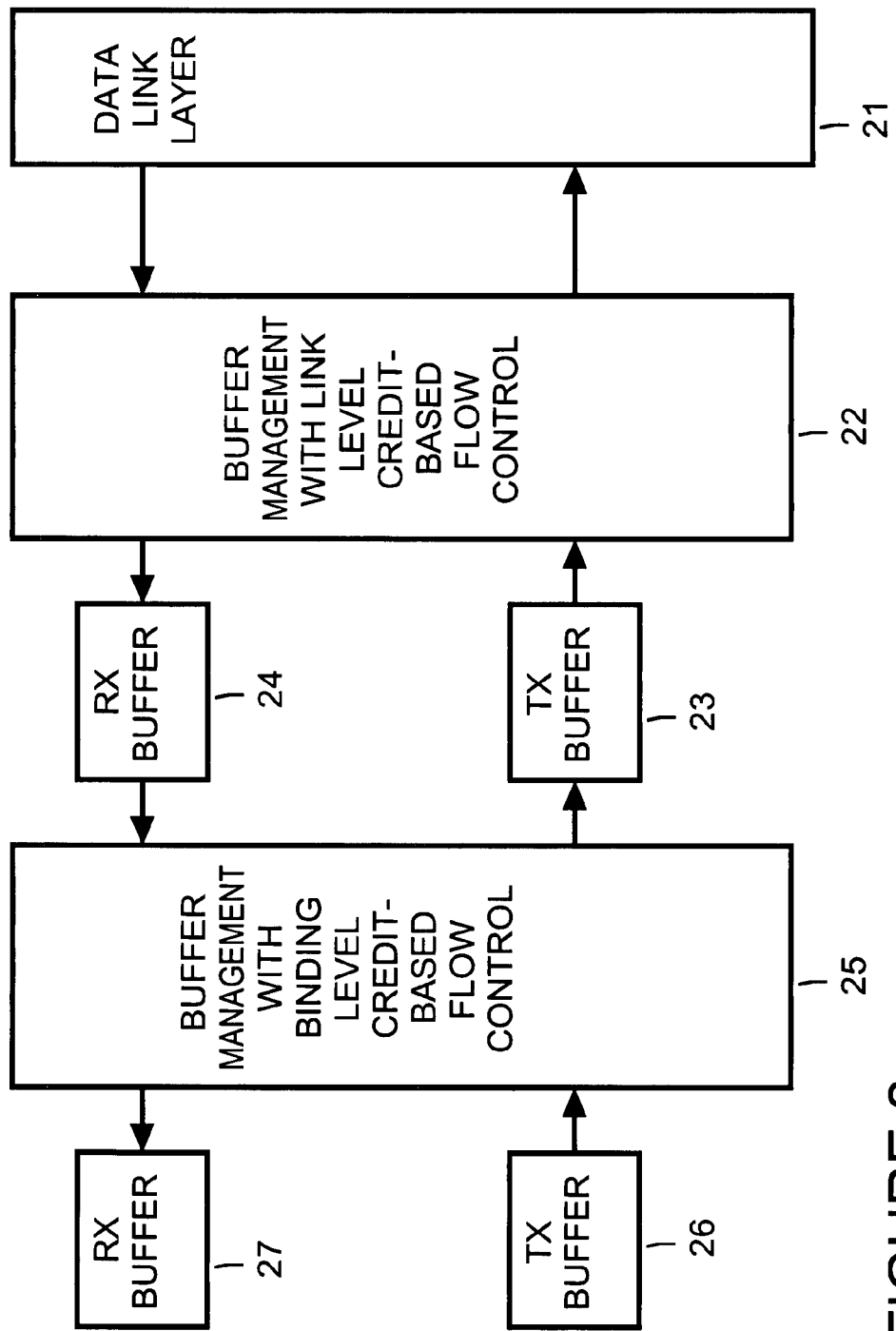
FIG. 2 is a simplified block diagram that illustrates use of buffer management with both link level and end-to-end credit-based flow control in accordance with an embodiment of the present invention.

FIG. 2 illustrates use of buffer management with both link level and end-to-end credit-based flow control. Each network node shown in FIG. 1, implements a layered protocol that has a physical layer, a data link layer and a transaction layer. For example, network node 14 includes a data link layer 21, as shown in FIG. 1. Description of network node 14 is exemplary as all the network nodes shown in FIG. 1 can include the functionality illustrated by FIG. 2.

Data link layer 21 communicates with a buffer management block 22. Buffer management block 22 performs link level credit based flow control. What is meant by link level is the layer of protocol that controls data flow between two network devices over a data link. For example, switch 10 (shown in FIG. 1) and network node 14 are both network devices that communicate over data link 104. Switch 10 and network node 14 perform link level flow control for all TLPs that flow over data link 104.

Buffer management 22 manages a receive (RX) buffer 24 and a transmit (TX) buffer 23. Receive buffer 24 includes three different memories for receiving three different types of message packets. Each memory is, for example, implemented as random access memory (RAM). A first of the three memories receives posted message packets. A second of the three memories receives non-posted message packets. A third of the three memories receives completions. Buffer management 22 performs credit based flow control for each of the three memories.

Buffer management 22 performs credit based flow control on the link level. In link-level credit-base flow control, credits are based on the amount of space available in receive buffers that receive data into the transaction layer from the data link layer. Both switch 10 and network node 14 advertise to each other an initial credit limit. Network node 14 will only send a TLP across data link 104 when sending the TLP will not exceed the current credit limit for switch 10. Upon sending a TLP, network node 14 will subtract the number of credits used by the TLP from the current credit limit for switch 10. When network node 14 finishes processing a TLP from receive buffer 24, network node 14 will signal a return of credits to the switch 10. DLLPs are used to communicate flow control information between node 14 and switch 10. Similarly, link level credit based flow control is performed between switch 10 and each of network nodes 11 through 17.

A buffer management block 25 performs end-to-end credit based flow control. Buffer management 25 manages a receive (RX) buffer 27 and a transmit (TX) buffer 26. Receive buffer 27 includes three different memories for receiving three different types of message packets. Each memory is, for example, implemented as random access memory (RAM). A first of the three memories receives posted message packets. A second of the three memories receives non-posted message packets. A third of the three memories receives completions. Buffer management 25 performs credit based flow control for each of the three memories.

Buffer management 25 performs end-to-end credit based flow control. What is meant by end-to-end credit based flow control is credit based flow control that is performed for data transfers between network endpoints. For example, an endpoint can be a network node or an I/O function within a network node that has multiple I/O functions. An example of a network node with multiple I/O functions is a network interface card with multiples ports. When each port has a separate network controller that network controller can serve as an I/O function within a node and thus as a network endpoint. For example, the network controller can be an Ethernet controller or a network controller that operates in accordance with another network protocol.

While switch 10 is a network device, switch 10 does not function as a network endpoint. Therefore, switch 10 does not implement end-to-end credit based flow control.

Performing end-to-end flow control prevents a network from being flooded with traffic that cannot be offloaded outside of the network fabric. For example, end-to-end flow control consists of two parts: (1) flow control initialization, and (2) flow control updates.

Flow control initialization is performed at network initiation, after the PCIe training protocol is performed and after management node 18 sets up bindings between host nodes and I/O nodes. For each binding, a network node sends out flow control initiate ($FC_{13}$ Init1) packets until the network node receives an FC_Init1 1 packet from the corresponding network node. Once an FC_Init1 packet is received for the binding, the network node sends out flow control initiate (FC_Init2) packets until the network node receives an FC_Init1 2 packet from the corresponding network node. At this point each network node is ready to perform end-to-end flow control for the binding.

Flow control updates are credit updates for end-to-end flow control. For example, credit updates are utilized for encapsulated translation layer packets (TLPs). The credit updates are sent as posted message packets. For example, credit updates are based on the size of the payload of a message packet. The payload includes 1 header unit per packet and n data units per packet where "n" equals Roundup(Length/FC unit size), where "FC unit size" is 4 dwords and where "Length" is the length of the portion of the packet that includes the data units.

Figure 3:
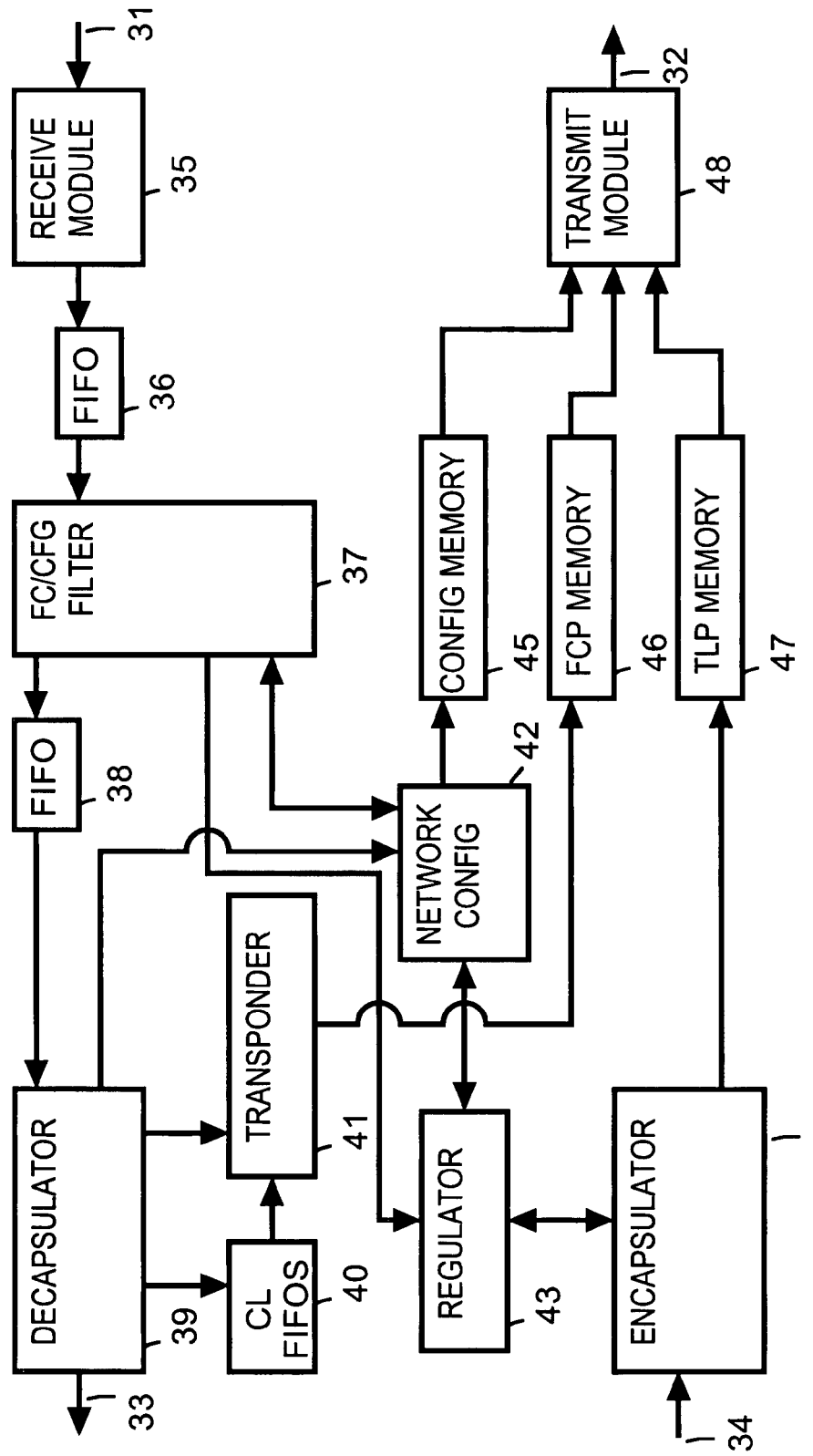
FIG. 3 is a simplified block diagram that illustrates implementation of buffer management with end-to-end credit-based flow control in accordance with an embodiment of the present invention.

FIG. 3 is a simplified block diagram that illustrates implementation of buffer management block 25. As represented by arrow 31, a receive module 35 handles receipt of message packets from receive buffer 24 (shown in FIG. 2) and places them in a first-in-first-out (FIFO) buffer 36.

A flow control/configuration (FC/CFG) filter 37 is used to identify configuration information and credit update information. Credit limit information is sent to a regulator 43. The configuration information is, for example, network configuration information sent by management node 18 during network configuration. Filter 37 sends configuration information to network configuration (CONFIG) block 42. Message packets that do not contain configuration information or credit limit information are placed by filter 37 into a FIFO buffer 38.

A decapsulator 39 receives message packets from FIFO buffer 38. Decapsulator 39 strips off the packet header and, as represented by an arrow 33, places the remainder of the message packet in the appropriate memory within RX buffer 27 (shown in FIG. 2), depending upon whether the message packet is a posted packet, a non-posted packet or a completion.

For each message packet placed in a memory within RX buffer 27, credit limit (CL) FIFOs 40 store a packet type and a packet size. When a device core for the network node processes a message packet from within one of the memories within RX buffer 27, this information is communicated to a transponder 41 by decapsulator 39. Transponder 41 then accesses the appropriate FIFO from CL FIFOs 40, dependent upon what type (posted, non-posted or completion) of message packet was processed to determine the packet size. Transponder 41 then creates a credit update packet that is posted to a flow control priority (FCP) memory 46. A transmit module 48 then forwards the credit update packet into TX buffer 23 (shown in FIG. 2), as represented by an arrow 32.

FCP memory 46 is used to transmit credit update packets to avoid livelocks because credit update packets are posted TLPs and thus can be blocked if they are sent via a TLP memory 47.

An encapsulator 44 receives data from TX buffer 26 (shown in FIG. 2), as represented by an arrow 34, and adds a header to form a TLP packet. The TLP packet is placed in TLP memory 47. Transmit module 48 then forwards the credit update packet into TX buffer 23 (shown in FIG. 2), as represented by arrow 32.

Before encapsulator 44 places a TLP packet in TLP memory 47, encapsulator 44 checks to make sure that the end point for the message has room to receive the message. This is done by checking information stored within regulator 43 to determine a current credit limit for the end point.

For each binding of network node 14, regulator 43 tracks credit limits for each of the three message types. At configuration time, credit limits for each binding of network node 14 are determined by management node 18 and sent to network configuration block 42 as configuration information. There are separate credit limits for each message type. During configuration time, network configuration block 42 uses a separate configuration memory 45 to transmit configuration messages. Transmit module 48 forwards the configuration messages into TX buffer 23 (shown in FIG. 2), as represented by arrow 32.

Regulator 43 obtains initial credit limits from network configuration block 42. Thereafter, regulator 43 updates the credit limits whenever a message packet is sent by encapsulator 44 and whenever credit update information is received by network node 14. Within regulator 43, counters used to count credits are modular and modular arithmetic is used to determine a current credit limit.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A first network node comprising:
a first receive buffer;
a first buffer management block to perform link level credit based flow control for network packets placed by the first buffer management block in the first receive buffer, wherein the network packets are sent by a second network node and passed to the first network node through a network device, and wherein the link level credit based flow control is performed for a link between the first network node and the network device;
a second receive buffer; and a second buffer management block to perform end-to-end credit based flow control for network packets that the second buffer management block receives from the first receive buffer and processes before placing data in the second receive buffer, wherein the end-to-end credit based flow control is for data transfer between the first and second network nodes, wherein the second buffer management block comprises:
an encapsulator to form outbound network packets for transmission to the second network node;
a regulator to indicate whether the second network node for a particular outbound network packet formed by the encapsulator has room to receive the particular outbound network packet, the regulator to track a credit limit for a binding of the first network node to the second network node;
a network configuration block to store an initial credit limit for each binding of the first network node to a corresponding network end point, the network configuration block to provide the initial credit limit to the regulator; and
a filter to remove configuration information within the network packets received from the first receive buffer, and to forward the configuration information to the network configuration block, the filter also to remove credit update information from the network packets received from the first receive buffer, and to forward the credit update information to the regulator.

2. A first network node as in claim 1, for use in a network that operates in accordance with a Peripheral Component Interconnect Express (PCIe) protocol.

3. A first network node as in claim 1,
wherein the regulator includes counters configured to count credits, the counters being modular and the regulator configured to use modular arithmetic to determine a current credit limit.

4. A first network node as in claim 1 wherein the second buffer management block further comprises:
a decapsulator configured to remove a packet header before placing a remainder of a network packet received from the first receive buffer in the second receive buffer;
a transponder configured to provide credit update information to the second network node; and
a credit limit memory configured to store information pertaining to a packet type and packet size for each network packet processed by the decapsulator, the transponder configured to formulate, using the stored information, the credit update information.

5. A first network node as in claim 1 wherein the second buffer management block further comprises:
a decapsulator configured to remove a packet header before placing a remainder of a network packet received from the first receive buffer in the second receive buffer;
a transponder configured to provide credit update information to the second network node.

6. A first network node as in claim 1 wherein the second buffer management block further comprises:
a decapsulator configured to remove a packet header before placing a remainder of a network packet received from the first receive buffer in the second receive buffer;
a transponder configured to provide credit update information to the second network node;
a credit limit memory configured to store information pertaining to a packet type and packet size for each network packet processed by the decapsulator, the transponder configured to formulate, using the stored information, the credit update information;
a first memory to receive the outbound network packets formed by the encapsulator;
a second memory to receive from the transponder network packets that contain credit update information; and
a transmit module configured to place the network packets formed by the encapsulator and the network packets from the transponder into a transmit buffer.

7. A first network node as in claim 1, wherein the network device is a network switch, wherein the link level credit based flow control is for data transfer between the first network node and the network switch, and wherein the end-to-end credit based flow control is for the data transfer between the first and second network nodes through the network switch.

8. A first network node as in claim 1, wherein the first buffer management block is to further perform the link level credit based flow control for data transfer between the first network node and the network device based on space available of a receive buffer in the network device, and
the second buffer management block is to perform the end-to-end credit based flow control for the data transfer between the first and second network nodes based on an available space of a receive buffer in the second network node.

9. A method by which a first network node provides flow control for network packets transmitted between the first network node and a second network node through a network device on a network, the method comprising: providing, at the first network node, link level credit based flow control for the network packets that flow between the first network node and the network device linked to the first network node, wherein the link level credit based flow control is based on an available space of a receive buffer in the network device; and providing, at the first network node, end-to-end credit based flow control for the network packets that flow between the first network node and the second network node through the network device, wherein the end-to-end credit based flow control is based on an available space of a receive buffer in the second network node, wherein providing the end-to-end credit based flow control includes: providing credit update information to the second network node when packets sent by the second network node to the first network node are processed by the first network node; forming, by an encapsulator, outbound network packets for transmission to the second network node; indicating, by a regulator, whether the second network node for a particular outbound network packet formed by the encapsulator has room to receive the network packet, the regulator to track a credit limit for a binding of the first network node to the second network node; storing, by a network configuration block, an initial credit limit for each binding of the first network node to a corresponding network end point, the network configuration block to provide the initial credit limit to the regulator; and removing, by a filter, configuration information and credit update information from network packets; and forwarding, by the filter, the removed configuration information to the network configuration block, and the removed credit update information to the regulator.

10. A method as in claim 9 wherein the network operates in accordance with a Peripheral Component Interconnect Express (PCIe) protocol.

11. A method as in claim 9 wherein providing the end-to-end credit based flow control further includes:
determining whether the second network node has room to receive a network packet before the first network node sends the network packet to the second network node.

12. A method as in claim 9, wherein the network device is a network switch, wherein the link level credit based flow control is for the flow of the network packets between the first network node and the network switch, and wherein the end-to-end credit based flow control is for the flow of the network packets between the first and second network nodes through the network switch.

13. A first network node for use within a network, the first network node comprising: a first buffer management block to provide link level credit based flow control for network packets that travel between the first network node and a network device linked to the first network node, wherein the link level credit based flow control is based on an available space of a receive buffer on the network device, and wherein the network packets are destined from the first network node to a second network node through the network device; and a second buffer management block to provide end-to-end credit based flow control for the network packets that travel between the first network node and the second network node through the network device, wherein the end-to-end credit based flow control is based on an available space of a receive buffer in the second network node, wherein the second buffer management block comprises: a transponder to provide credit update information to the second network node when packets sent by the second network node to the first network node are processed by the first network node; an encapsulator to form outbound network packets for transmission to the second network node; a regulator to indicate whether the second network node for a particular outbound network packet formed by the encapsulator has room to receive the particular outbound network packet, the regulator to track a credit limit for a binding of the first network node to the second network node; a network configuration block to store an initial credit limit for each binding of the first network node to a corresponding network end point, the network configuration block to provide the initial credit limit to the regulator; and a filter to remove configuration information within received network packets, and to forward the configuration information to the network configuration block, the filter further to remove credit update information from the received network packets, and to forward the credit update information to the regulator.

14. A first network node as in claim 13 wherein the network operates in accordance with a Peripheral Component Interconnect Express (PCIe) protocol.

15. A first network node as in claim 13 wherein the second buffer management block further comprises:
a credit limit memory to store information pertaining to a packet type and packet size for each network packet received from the second network node, the information being used to formulate credit update information provided by the first network node to the second network node.

16. A first network node as in claim 13, wherein the network device is a network switch, wherein the link level credit based flow control is for the network packets that travel between the first network node and the network switch, and wherein the end-to-end credit based flow control is for the network packets that travel between the first and second network nodes through the network switch.

* * * * *